Jan. 5, 1971   E. W. SPRINGER   3,553,546
PULSE CONTROL NEUTRALIZATION SYSTEM
Filed Jan. 6, 1969   3 Sheets-Sheet 1

INVENTOR
EARL W. SPRINGER
BY
Hood, Gust, Irish & Lundy
ATTORNEYS

INVENTOR
EARL W. SPRINGER
BY
Hood, Gust, Irish & Lundy
ATTORNEYS

United States Patent Office 3,553,546
Patented Jan. 5, 1971

3,553,546
PULSE CONTROL NEUTRALIZATION SYSTEM
Earl W. Springer, Box 220, Fairland, Ind. 46126
Filed Jan. 6, 1969, Ser. No. 789,243
Int. Cl. H02p 7/68
U.S. Cl. 318—48                                    9 Claims

ABSTRACT OF THE DISCLOSURE

A system comprising output means and first means for driving the output means in one direction and second means for driving the output means in the opposite direction. A first network for energizing the first drive means and a second network for energizing the second drive means are provided. Further, first means is provided for disabling the first network when the second drive means is energized and second means is provided for disabling the second network when the first drive means is energized, each network including a silicon controlled rectifier through which its associated drive means is energized. In one embodiment, the disabling means, respectively, include relay means for disconnecting the gate control electrodes of their respective associated silicon controlled rectifiers. In another embodiment, the disabling means, respectively, include means for desensitizing the amplifiers connected to the gate control electrodes of their respective associated silicon controlled rectifiers.

It is a primary object of my invention to provide, in a system comprising an output means and a two-channel network for operating the output means, one network being effective to drive the output means in one direction and the other network being effective to drive the output means in the opposite direction, means for disabling one network while the other network is operative to drive the output means. Particularly, it is an object of my invention to provide such disabling means when each network includes, at its input end, sensing means providing signal levels in the microampere range and, at its output end, an electromagnetic driver requiring, for instance, up to 6 amperes at 12 volts. It will be appreciated that, when one of the networks is energized to operate the output means, the spurious signals developed by the one network will be sufficient, in many cases, to energize the other network. For instance, the inductive clamping voltages developed by operating a 6 ampere electromagnetic device will produce relatively high value spurious signal levels in the associated circuitry, i.e., in the other network. This problem of spurious signals in a two channel or dual network system is commonly referred to as cross talk. This cross talk problem is particularly critical and difficult to solve when both channels of a system are extremely sensitive, i.e., are energized by extremely low level inputs.

I refer now to my pending application Ser. No. 739,406 filed June 24, 1968 and titled "Altitude Indicating and Reporting System." In that application, I have disclosed an output means which is a shaft-driven encoder and a first rotary stepping motor for driving the encoder in one direction and a second rotary stepping motor for driving the encoder in the opposite direction. Each motor is energized through a network comprising a light sensing device, amplifier means connected to the light sensing device and arranged to provide an amplified output when the light sensing device is subjected to a predetermined level of light, and a silicon controlled rectifier for energizing the motor, the gate control electrode of the rectifier being connected to the output of the amplifier means. Thus, when the light sensing device of one network is subjected to a predetermined level of light, the encoder is driven in one direction and when the other light sensing device is subjected to the predetermined level of light, the encoder is driven in the opposite direction. Since light sensing devices and light responsive devices, or for that matter any device for sensing relatively low energy levels, have relatively low level signal outputs, the circuitry associated with such devices must be extremely sensitive to low level signals. Thus, cross talk problems are prevalent in such two-channel systems.

In this description and in the claims appended hereto, the terms "output means," and "means for driving said output means" are to be interpreted as including any device for doing work or recording information and which can be driven by an electromagnetic device and any type of electromagnetic driving device, respectively. Further, in this description and in the appended claims, the terms "sensing means" is to be interpreted as including any type of sensing device for sensing a physical occurrence and providing a relatively low level signal output.

It is an object of my invention, therefore, to provide a system comprising output means, first means for driving the output means in one direction, second means for driving the output means in the opposite direction, first sensing means, second sensing means, first circuit means for operatively connecting the first sensing means to the first drive means, second circuit means for operatively connecting the second sensing means to the second drive means, first means for disabling the first circuit means when the second drive means is energized, and second means for disabling the second circuit means when the first drive means is energized, whereby, when one of the drive means is energized, the other of the drive means cannot be energized. Preferably, the first circuit means includes first switch means for energizing the first drive means and first amplifier means for operating the first switch means to energize the first drive means when the first sensing means provides a predetermined output and the second circuit means includes second switch means for energizing the second drive means and second amplifier means for operating the second switch means to energize the second drive means when the second sensing means provides a predetermined output.

Another object of my invention is to provide such a system in which the first and second switch means are, respectively, silicon controlled rectifiers and in which the first and second disabling means are, respectively, relays for disconnecting the gate control electrode of their associated silicon controlled rectifiers from their associated amplifier means. The field coil of the relay of the first disabling means is energized through the second switch means and, conversely, the field coil of the relay of the second disabling means is energized through the first switch means.

Another object of my invention is to provide such a system in which the first disabling means is a silicon controlled rectifier arranged to be triggered on by the second amplifier means to desensitize the first amplifier means and in which the second disabling means is a silicon controlled rectifier arranged to be triggered on by the first amplifier means to desensitize the second amplifier means. Preferably, the amplifier means are, respectively, unijunction transistor amplifier or oscillator circuits and the disabling silicon controlled rectifiers are arranged, respectively, when rendered conductive, to ground the emitter circuits of the amplifier means through a suitable resistor.

Other objects and features of my invention will become apparent as this description progresses.

To the accomplishment of the above and related objects, my invention may be embodied in the forms illustrated in the accompanying drawings, attention being called to the fact, however, that the drawings are illustrative only and that changes may be made in the specific constructions illustrated and described, so long as the scope of the appended claims is not violated.

Figure 1:
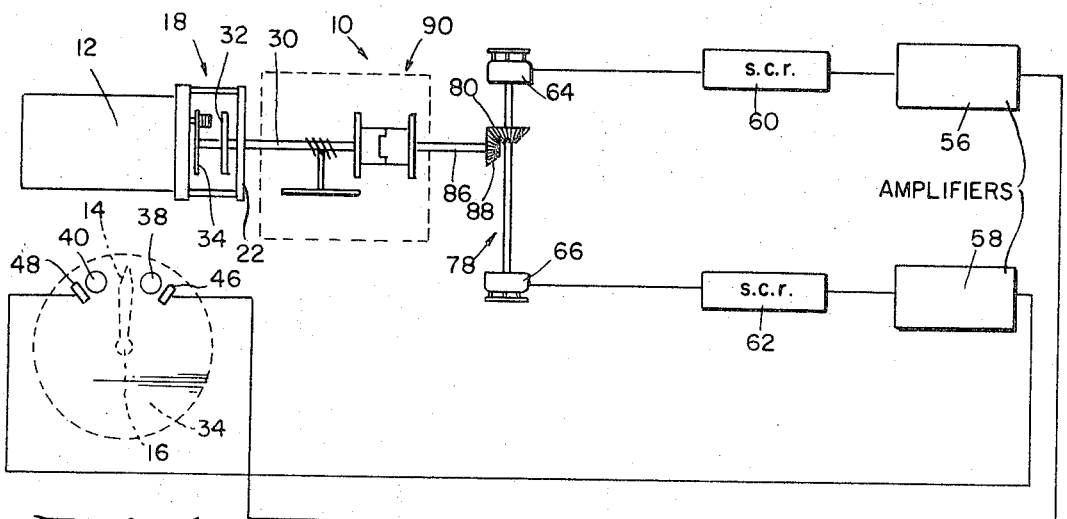
FIG. 1 is a block diagram of one embodiment of my altitude indicating and reporting system disclosed in my aforesaid application Ser. No. 739,406.

Referring now to FIG. 1, it will be seen that my altitude indicating and reporting system, indicated generally by the reference numeral 10, is illustrated, the system comprising a standard aircraft altimeter 12 which is equipped with an indicator or pointer 14 arranged for pivotal movement about an axis indicated at 16 and means, indicated generally by the reference numeral 18, for tracking the movement of the indicator 14. The altimeter 12 has a glass cover plate covering and protecting the indicator 14 and the scale about which the indicator moves. My tracking means 18 is arranged to track the movement of the indicator 14 by projecting and reflecting light through this cover plate.

Specifically, the tracking means 18 is mounted in front of the cover plate of the altimeter to be in alignment with the pivot axis 16 of the indicator 14. As illustrated, I mount a support plate 22 on the front face of the altimeter by means of stand-offs, the support plate carrying a centrally located bearing (not shown) defining a journal axis extending through the pivot axis 16 of the indicator 14. The tracking means 18 comprises a shaft 30 journalled in this bearing in the support plate 22 and a slip-ring commutator 32 and another support plate 34 mounted on the shaft 30 for rotation therewith. The slip-ring commutator 32 is conventional in structure and used for conventional purposes.

I have provided a pair of light sources 38, 40 mounted on the support plate 34 to direct light through the cover plate of the altimeter toward the path of movement of the indicator 14. A light-responsive device 46, 48 is associated with each light source 38, 40, the light-responsive surface of each device facing the path of movement of the indicator 14. Each light-responsive device 46, 48 is arranged electrically to change state when the amount of light impinging thereon, i.e., impinging on its light-responsive surface, changes to a predetermined degree. Thus, since I project light at the path of movement of the indicator 14, when the indicator moves adjacent to one of the light-responsive devices 46, 48, the indicator will reflect light back toward the device to cause it to change state.

Any number of types of light-responsive devices will electrically change state when the amount of light impinging thereon is changed. Thus, I am not limited to any particular light-responsive device. For instance, there are commercially available light-actuated transistors and diodes which will permit current flow or prevent current flow depending on the amount of light impinging thereon. For reasons which will become apparent as this description progresses, I prefer to use a simple photovoltaic cell for generating an electrical potential upon the incidence of light thereon. Such cells, which are normally fabricated from a material such as selenium or silicon, are particularly suited for my system because of their reliability and extremely small size. Presently, I prefer to use such cells which are fabricated from silicon and which will produce approximately 18 microamperes across a microammeter having a measured DC resistance of 8000 ohms when the indicator 14 reflects light back thereon. Thus, it is necessary to amplify, in some manner, the outputs of the light-responsive devices 46, 48 so that these outputs can be used by other electrical equipment.

Referring now to the block diagram of FIG. 1, it will be seen that I have provided an amplifier for amplifying the output of each light-responsive device 46, 48, these amplifiers being indicated by the reference numerals 56, 58. Each amplifier 56, 58 is coupled to and arranged to energize a silicon controlled rectifier 60, 62 which is, in turn, connected to and arranged to energize a rotary stepping motor 64, 66. These rotary stepping motors 64, 66 comprise drive means for the support plate 34 on which the light sources 38, 40 and light-responsive devices 46, 48 are mounted. That is, the motors 64, 66 drive a common shaft 78 which is coupled through bevel gears 80, 88 and a shaft 86 to the shaft 30 on which the support plate 34 is mounted.

In FIG. 1, and as disclosed in my aforesaid pending application Ser. No. 739,406, I provide an encoder 90 for registering the position of the shaft 30, thereby to register the altitude indicated by the pointer 14. Thus, the encoder 90 is an output means which is driven in one direction by the rotary stepping motor 64 and in the opposite direction by the rotary stepping motor 66. The amplifier means 56 and silicon controlled rectifier 60 comprise circuit means for operatively connecting the motor 64 to the device 46 while the amplifier means 58 and silicon controlled rectifier 62 comprise circuit means for operatively connecting the motor 66 to the device 48. Within the scope of my invention, the motors 64, 66 are drive means and the devices 46, 48 are sensing means.

I prefer to use rotary stepping motors 64, 66 which are solenoid-type, rotary stepping motors. I have found that such a motor sold under the commercial name Ledex is suitable for the purpose of driving the encoder 90 and the support plate 34. I prefer to use Ledex units which require 6 amperes at 12 volts DC for normal rotation. The structure of these motors will be discussed further in conjunction with FIGS. 3 and 4.

Figure 2:
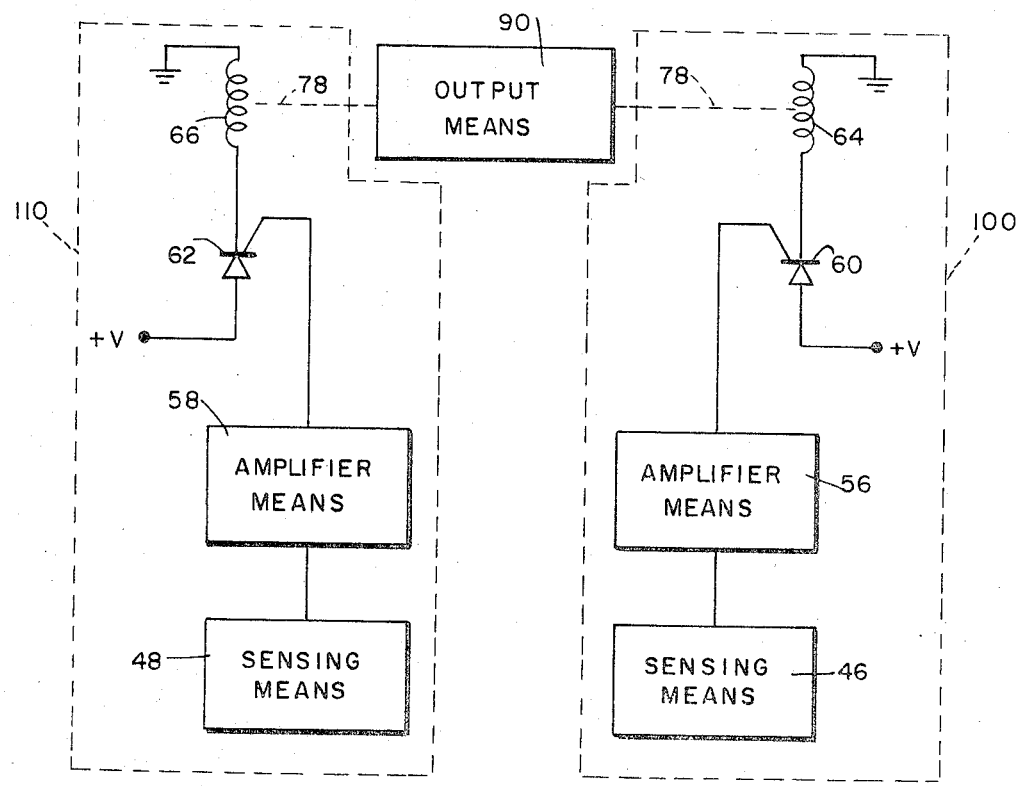
FIG. 2 is a block diagram showing a system of the general type with which my present invention is concerned.

FIG. 2 is a simplified block diagram of the type of system illustrated in FIG. 1, like reference numerals representing like parts. One of the two channels of the system in FIG. 2 is indicated by the reference numeral 100 and the other of the two channels is indicated by the reference numeral 110. The channel 100 comprises first drive means 64 for driving the output means 90 in one direction, first sensing means 46, and first circuit means for operatively connecting the first sensing means to the first drive means, the first circuit means including first switch means 60 for energizing the first drive means and first amplifier means for operating the first switch means to energize the first drive means when the first sensing means provides a predetermined output. Similarly, the channel 110 comprises second drive means 66 for driving the output means 90 in the opposite direction, second sensing means 48, and second circuit means for operatively connecting the second sensing means to the second drive means, the second circuit means including second switch means 62 for energizing the second drive means and second amplifier means 58 for operating the second switch means to energize the second drive means when the second sensing means provides a predetermined output.

Since each amplifier means 56, 58 must be sensitive to signal levels less than 18 microamperes and since each motor 64, 66 requires 6 amperes at 12 volts, it will be appreciated that, when one motor 64, 66 is energized, the spurious signals resulting from such energization, if not properly suppressed, may cause the amplifier means 56, 58 and switch means 60, 62 of the other channel to energize the other motor. If such a cross talk situation develops, one motor 64, 66 will be driving the output means 90 in one direction while the other motor is attempting to drive the output means in the opposite direction. Thus, a locking situation will develop.

Figure 3:
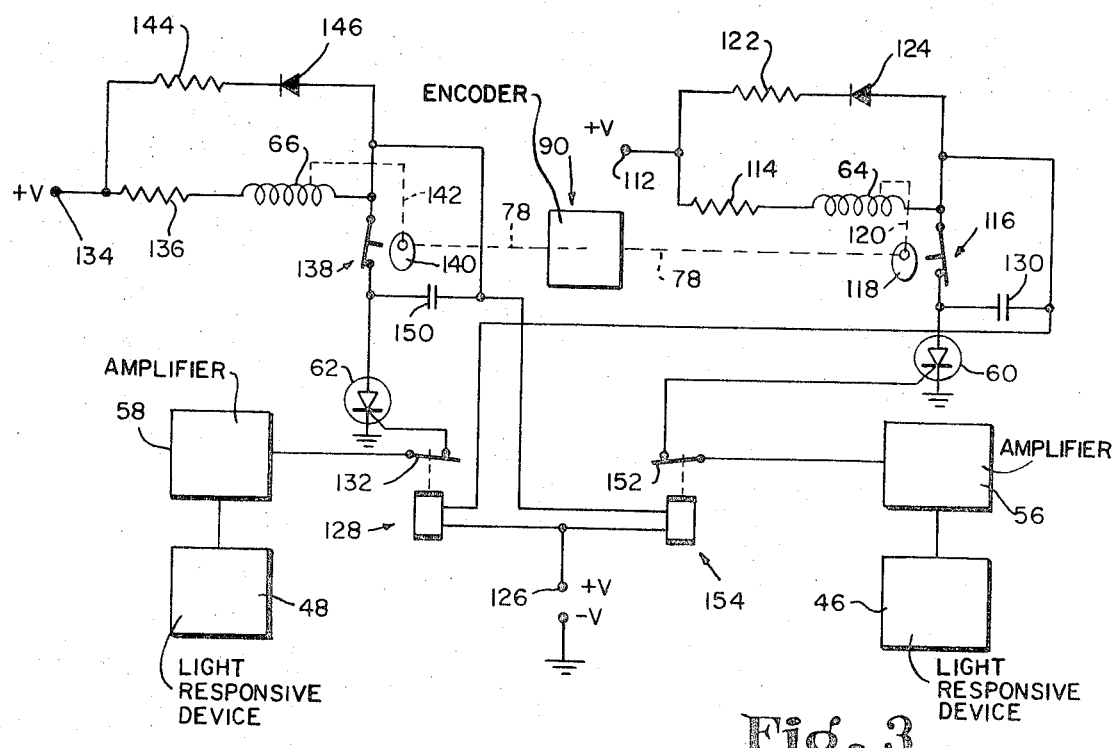
FIG. 3 is a block diagram showing one preferred embodiment of my invention, which embodiment utilizes relays as disabling means.

Referring now to FIG. 3, one embodiment of my invention will be discussed. In the embodiment of FIG. 3, the motor 64 is energized by current flow from a positive voltage terminal 112 through a resistor 114, contacts 116 and the anode and cathode electrodes of the silicon controlled rectifier 60 when the rectifier is conductive. The contacts 116 are opened a predetermined time after the motor 64 is energized by a cam 118 which is driven by the motor as indicated by the shaft connection 120. Ledex motors are conventionally provided by such cams. I show a resistor 122 and a diode 124 connected in series across the winding of the motor 64. When the silicon controlled rectifier 60 is rendered conductive to energize the motor 64, current can flow from a positive voltage terminal 126 through the field coil of a relay 128, the contacts 116 and the anode and cathode electrodes of the rectifier. I show a capacitor 130 connected between the contacts 116 and the field coil of the relay 128.

The relay 128 includes a normally closed switch 132.

The motor 66 is energized by current flow from a positive voltage terminal 134 through a resistor 136, contacts 138 and the anode and cathode electrodes of the silicon controlled rectifier 62 when the rectifier is conductive. The contacts 138 are opened a predetermined time after the motor 66 is energized by a cam 140 which is driven by the motor as indicated by the shaft connection 142. I show a resistor 144 and a diode 146 connected across the winding of the motor 66.

When the silicon controlled rectifier 62 is rendered conductive, a relay 154, which includes a normally closed switch 152, is energized by current flow from the positive voltage terminal 126 through the field coil of the relay, the contacts 138 and the anode and cathode electrodes of the rectifier 62. Thus, when the motor 64 is energized, the relay 128 is energized and, conversely, when the motor 66 is energized, the relay 154 is energized.

The output of the amplifier means 56 is connected through the switch 152 to the gate control electrode of the silicon controlled rectifier 60 so that, when the sensing means 46 provides a predetermined output, the amplifier means 56 will pulse the gate control electrode of the rectifier 60 to render it conductive. Similarly, the output of the amplifier means 58 is connected through the switch 132 to the gate control electrode of the silicon controlled rectifier 62 so that, when the sensing means 48 provides a predetermined output, the amplifier means will pulse the rectifier 62 to render it conductive. Therefore, when the motor 66 is energized, the relay 154 is energized to open the switch 152 to disconnect the output of the amplifier means 56 from the gate control electrode of the rectifier 60 and, when the motor 64 is energized, the relay 128 is energized to open the switch 132 to disconnect the output of the amplifier means 58 from the gate control electrode of the rectifier 62. The relay 128 is thus means for disabling the circuit means comprising the amplifier means 58 and the rectifier 62 and the relay 154 is means for disabling the circuit means comprising the amplifier means 56 and the rectifier 60.

I show a capacitor 150, similar to the capacitor 130, connected between the contacts 138 and the relay 154.

I prefer to use a 28 volt direct current source and to connect the negative voltage side of the source to ground as illustrated. The resistor 114, 136 is thus a 3.3 ohm resistor for dropping the voltage on the coil to 12 volts. I prefer that each resistor 122, 144 to be a 22 ohm resistor. The resistors 122, 144 and their associated diodes 124, 146 provide for suitable inductive surge suppression. The resistors 122, 144 protect their associated diodes 124, 146 from excessive current surges and shorten the stepping time of their respective motors 64, 66. I prefer that the capacitors 130, 150 be .5 microfarad capacitors.

Figure 4:
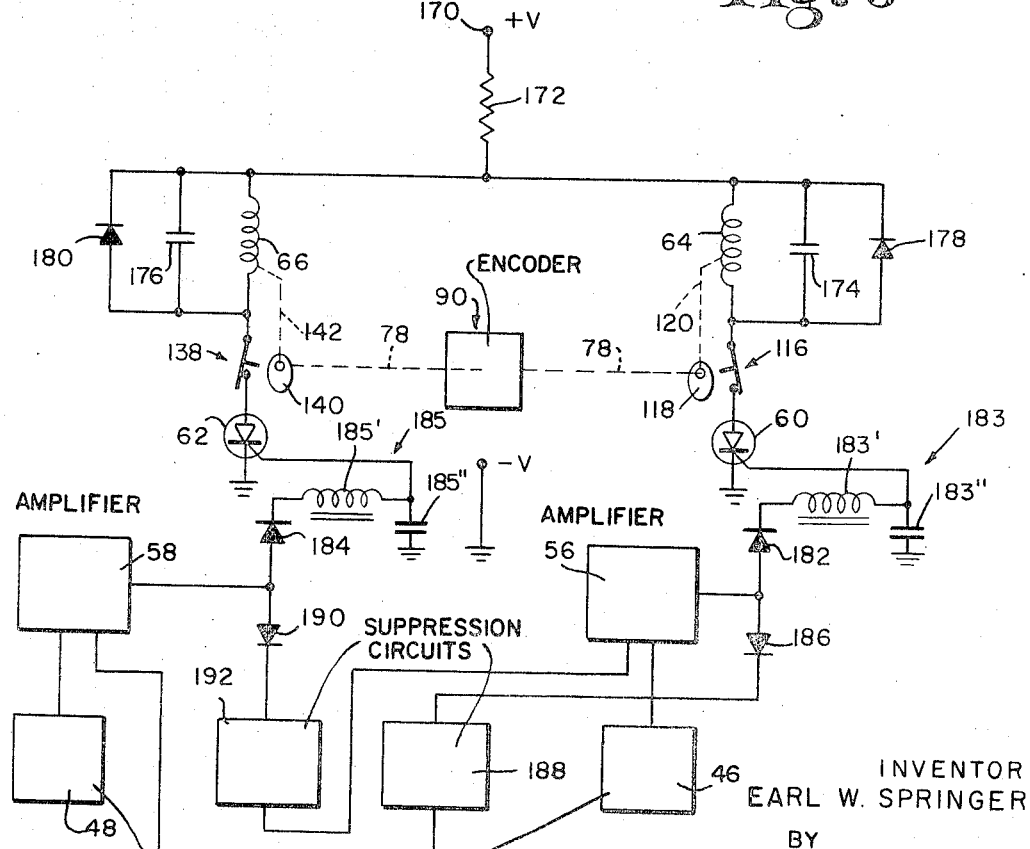
FIG. 4 is a block diagram of another embodiment of my invention, which embodiment utilizes solid state circuit components as disabling means.

Referring now to FIG. 4, I will discuss another embodiment of my invention. In the embodiment of FIG. 4, the motors 64, 66 are energized by current flow from a common positive voltage terminal 170 and through a common resistor 172. For arc suppression reasons, I connect a .5 microfarad capacitor 174, 176 in parallel with the field coil of each motor 64, 66 and a diode 178, 180 in parallel with each such capacitor. The silicon controlled rectifier 60 is connected to the amplifier means 56 through a diode 182 and a delay circuit 183 including a 1 millihenry inductor 183' and the silicon controlled rectifier 62 is connected to the amplifier means 58 through a diode 184 and a delay circuit 185 including a 1 millihenry inductor 185'.

The delay circuit 183 includes a .01 microfarad capacitor 183" connected between the junction of the gate electrode of rectifier 60 with the inductor 183' and ground and the delay circuit 185 includes a .01 microfarad capacitor 185" connected between the junction of the gate electrode of the rectifier 62 with the inductor 185' and ground. The function of these delay circuits 183, 185 will become apparent as this description proceeds.

Further, in the embodiment of FIG. 4, the output of the amplifier means 56 is connected through a diode 186 and a circuit 188 to the amplifier means 58 while the output of the amplifier means 58 is connected through a diode 190 and a circuit 192 to the amplifier means 56. I prefer to call the circuits 188 and 192 suppression circuits because that is their respective functions. That is, the circuit 188 is effective to suppress or disable the amplifier means 58 while the circuit 192 is effective to suppress or disable the amplifier means 56. Thus, when the amplifier means 56 provides an output effective to energize the motor 64, the suppression circuit 188 suppresses the amplifier means 58 to prevent it from providing an output effective to energize the motor 66. Conversely, when the amplifier means 58 provides an output effective to energize the motor 66, the suppression circuit 192 suppresses the amplifier means 56 so that it cannot provide an output effective to energize the motor 64.

Figure 5:
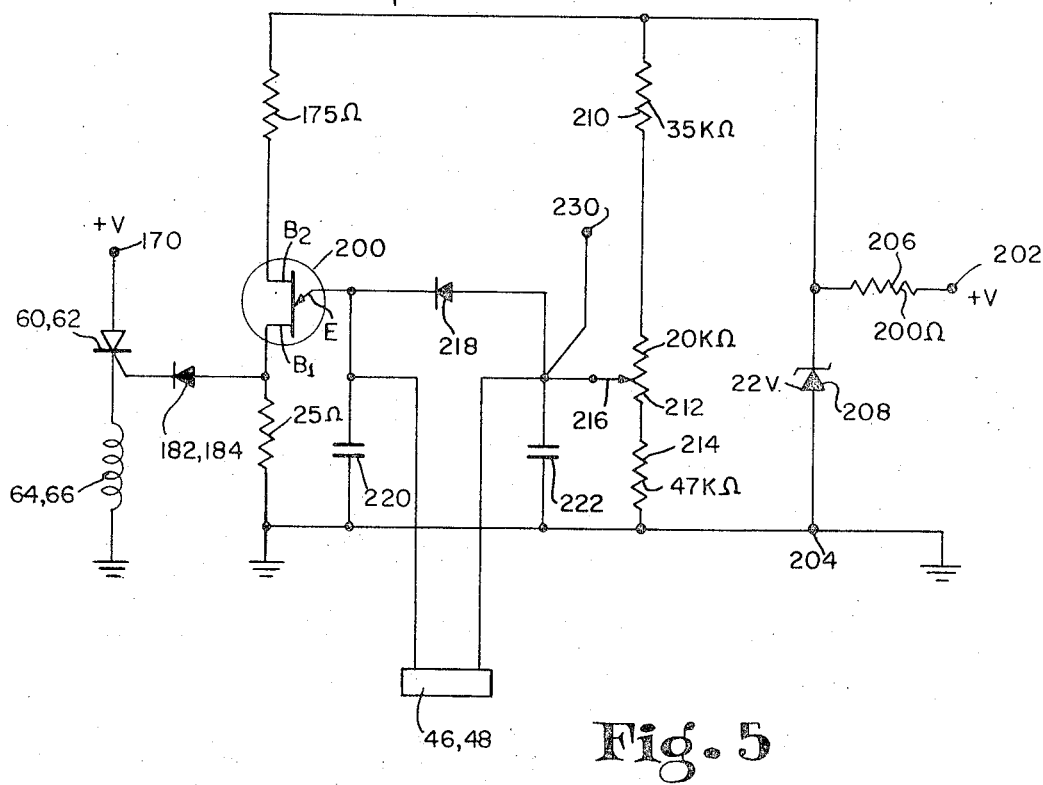
FIG. 5 is a schematic showing a sensing means, an amplifier means connected to the sensing means, switch means operatively connected to the amplifier means and drive means operatively connected to the switch means.
Figure 6:
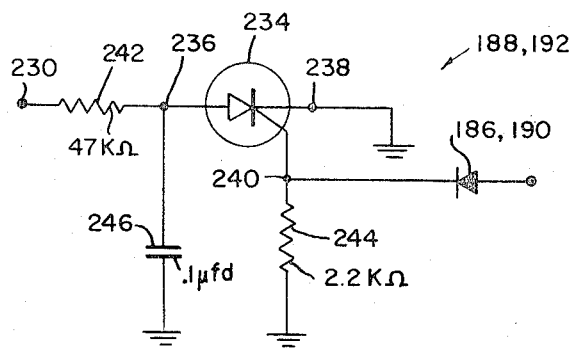
FIG. 6 is a schematic of my preferred solid state disabling means.

Referring now to FIGS. 5 and 6, it will be seen that I have illustrated the circuitry of my preferred amplifier means 56, 58 and preferred suppression circuits 188, 192.

Each amplifier means 56, 58, as illustrated in FIG. 5, can be described as a unijunction transistor amplifier or oscillator which has been modified to use the output of the photovoltaic-type sensing means 46, 48 and to provide an output suitable for triggering the silicon controlled rectifier 60, 62 connected thereto. For a discussion of this general type of unijunction transistor circuit, I refer to the Transistor Manual published in 1964 by the General Electric Company, and particularly to the discussion of the circuit shown in FIG. 13.37 on p. 326 of that manual.

Each of the illustrated amplifier means 56, 58, therefore, comprises a unijunction transistor 200 having an emitter electrode E, a base electrode $B_1$ and another base electrode $B_2$. I prefer to power the unijunction circuit with a 28 volt direct current power source connected across terminals 202, 204 and to connect in series a 200 ohm resistor 206 and a 22 volt Zener diode 208 across the terminals. A voltage divider circuit consisting of a 35 kilohm resistor 210, a 20 kilohm potentiometer 212 and a 47 kilohm resistor 214 is connected across the Zener diode 208 as illustrated. The wiper 216 of the potentiometer 212 is connected to the anode of a diode 218, the cathode of which is connected directly to the emitter electrode of the unijunction transistor 200. The positive voltage termination of the photovoltaic cell 46, 48 is connected to the cathode of the diode 218 and the negative voltage termination of the cell is connected to the anode of the diode. I have connected a .01 microfarad capacitor 220 between the junction of the cathode of the diode 218 with the emitter of the transistor 200 and ground and I have connected a .1 microfarad capacitor 222 between the junction of the anode of the diode 218 with the wiper 216 and ground. The $B_1$ electrode of the transistor 200 is connected through a diode 182, 184 to the gate control electrode of the rectifier 60, 62 as illustrated.

When the sensing means 46, 48 produces a predetermined potential which is applied to the emitter E of the transistor 200, the transistor changes state so that current can flow through the base electrodes $B_1$, $B_2$, this current being sufficient to trigger on the rectifier 60, 62 connected thereto. Specifically, when such a potential is applied by the sensing means 46, 48 across the diode 218, the unijunction circuit begins to oscillate and this oscillation produces current sufficient to trigger on the rectifier 60, 62. Thus, the potentiometer 212 is adjusted so that, when the sensing means 46, 48 is not providing such a potential, the circuit will not oscillate. It is the additional potential supplied by the photovoltaic-type sensing means 46, 48 which causes the unijunction transistor circuit to oscillate and to provide the current level sufficient to trigger on the rectifier 60, 62.

I prefer to use silicon controlled rectifiers 60, 62 which require a gate pulse of 2 volts at 15 milliamperes. Thus, each amplifier means 56, 58 responds to the very low, i.e., less than 18 microamperes, signal output of the sensing means 46, 48 to provide an output of, at least, 2 volts at 15 milliamperes. The amplifier means 56, 58 are, therefore, very sensitive to low level signal inputs.

The rectifiers 60, 62 which I prefer to use will function with a 5 microsecond pulse length.

The emitter E electrode of the unijunction transistor 200 is the control electrode of the transistor and, consequently, of the entire circuitry associated with the transistor. Thus, in order to prevent operation of one amplifier means 56, 58, I desensitize the emitter circuitry, i.e., the circuitry associated with the emitter E electrode of the unijunction 200, of the amplifier means. Specifically, I bring out a point 230 which is common to the junction of the negative termination of the sensing means 46, 48, the anode of the diode 218 and the wiper 216 of the potentiometer 212. I then connect one of my suppression circuits 188, 192 to this point 230.

Referring now to FIG. 6, my preferred suppression circuits 188, 192 will be discussed. Each circuit 188, 192 comprises a semiconductive device, preferably a silicon controlled rectifier 234 having an anode electrode 236, a cathode electrode 238, and a gate control electrode 240. The anode electrode 236 of each device 234 is connected through a 47 kilohm resistor 242 to the point 230 of its associated amplifier means 56, 58. A .1 microfarad capacitor 246 is connected between the anode electrode 236 and ground. The cathode electrode 238 of each device 234 is connected to ground. Each device 234 is turned on or rendered conductive by a pulse supplied to its gate control electrode 240 through its input diode 186, 190. The gate control electrode 240 of each device 234 is connected through a 2.2 kilohm resistor 244 to ground, which resistor prevents the device from being turned on by a spurious ground signal.

I prefer that each device 234 be a commercially available silicon controlled rectifier rated for 50 volts at 1.6 amperes, which device can be triggered on with a gate signal of .8 volt at 1 milliampere with a pulse length of 5 microseconds.

Referring again to FIG. 4 as well as to FIGS. 5 and 6, it will be seen that an output of the amplifier means 56 will be fed through the diode 186 to the gate control electrode 240 of the device 234 of the suppression circuit 188 whereby the emitter circuit of the amplifier means 58 will be desensitized. Conversely, when the amplifier means 58 provides an output through the diode 190 to the gate control electrode 240 of the device 234 of the suppression circuit 192, the device will be turned on to desensitize the emitter circuit of the amplifier means 56. Specifically, referring to FIGS. 5 and 6, it will be seen that the point 230 of the amplifier means 56, 58 is isolated from ground, when the device 234 connected thereto is non-conductive, by the .1 microfarad capacitor 222, by the portion of the potentiometer 212 below the wiper 216 and the resistor 214, and by the 47 kilohm resistor 242 in series with the .1 microfarad capacitor 246 connected between the anode electrode 236 and ground. Thus, when the device 234 is rendered conductive, the .1 microfarad capacitor 246 is by-passed in that the point 230 is connected directly through the resistor 242 and the device 234 to ground. Of course, when the device 234 is conductive, the device and the resistor 242 comprise a resistance network which is in parallel with the resistance network provided by the potentiometer 212 and resistor 214 and also the network provided by the capacitor 222.

I have found that my suppression circuits 188, 192 are completely effective for the purpose intended. By using the suppression circuits 188, 192, I can adjust the potentiometer 212 of each amplifier means 56, 58 so as to provide a system having the desired sensitivity, i.e., sensitivity to light change produced by movement of the indicator 4 (FIG. 1), without fear that cross talk problems will cause substantially simultaneous operation of the drive means 64, 66. In fact, my suppression circuits 188, 192, when used in conjunction with the circuitry of FIG. 5, are so effective that I can adjust the potentiometers 212 of the amplifier means 56, 58 to provide a desired sensitivity which is effective over a temperature range extending from minus 76° F. to plus 140° F.

As to the effective desensitizing time provided by the suppression circuits 188, 192, this time will depend upon the duration of the conductive period of the device 234 after it is turned on by a pulse to its gate control electrode 240. It will be appreciated that the point 230 of each amplifier means 56, 58 is held at a potential determined by the charging level of the capacitor 222 and that, therefore, the anode electrode 236 of the device 234 connected to the point through the resistor 242 will be subjected to a potential which is high enough to hold the device 234 conductive for a reasonable period of time. I have found that the time periods provided by the circuit parameters discussed in conjunction with FIGS. 5 and 6 and the aforesaid Ledex motors 64, 66 is sufficient to prevent simultaneous energization of the motors.

As to the time periods involved in the relay circuit of FIG. 3, the relays 128, 154 are sufficiently fast-acting to prevent simultaneous energization of motors 64, 66. I prefer that the relays 128, 154 be Potter and Brumfield type JR 1050. These relays are single pole, double throw relays having a coil resistance of 2400 ohms, operating at 24 volts direct current. These relays will open their contacts in three milliseconds and close them in .5 millisecond. These relays are reed-type relays.

In any event, as will be appreciated by those familiar with solenoid-type devices and the spurious signals generated by energization and deenergization thereof, I prefer to disable channel 100 (FIG. 2) until after the contacts 138 of motor 66 are opened and to disable channel 110 until after the contacts 116 of motor 64 are opened. It is the opening of these contacts 116, 138 which produces the most damaging spurious signal levels.

In the illustrative embodiment of FIG. 4, the delay circuits 183, 185 are effective to establish ideal timing conditions for operation of the suppression circuits 188, 192. Specifically, the inductor 183' and capacitor 183" of the circuit 183 provide a 20 millisecond delay in turning on the rectifier 60. That is, the rectifier 234 of the suppression circuit 188 is turned on 20 milliseconds before the rectifier 60 is turned on, thereby to desensitize the amplifier means 58 before the rectifier 60 is turned on to energize the motor 64. Similarly, the inductor 185' and capacitor 185" provide a 20 millisecond delay in turning on the rectifier 62. It will be appreciated, therefore, that the delay circuits 183, 185 cooperate with their respective suppression circuits 188, 192 to desensitize the amplifier means 56, 58 connected thereto before any spurious signals can be developed. For convenience in description, I refer to the capacitors 183″, 185″ as delay capacitors.

In view of the foregoing discussion, it will be appreciated that the first amplifier means 56 comprises a first circuit (FIG. 5) including an output $E_1$ connected to the first switch means 60 and a first transistor 200 having a control electrode E operatively connected to the first sensing means 46 and the second amplifier means 58 comprises a second circuit (FIG. 5) including an output $B_1$ connected to the second switch means 62 and a second transistor having a control electrode E operatively connected to the second sensing means 48. The first disabling means, i.e., suppression circuit 192, includes a first semiconductor device 234 having an anode electrode 236, a cathode electrode 238, and a gate electrode 240 and the second disabling means, i.e., the suppression circuit 188, includes a second semi-conductor device having an anode electrode 236, a cathode electrode 238 and a gate control electrode 240. First means, including the resistor 242 and diode 218, is provided for operatively connecting the anode electrode 236 of the first device 234 to the control electrode E of the first transistor 200, second means, which may be a conductor wire, is provided for operatively connecting the cathode electrode 238 of the first device 234 to ground, and third means, including the diode 190, is provided for operatively connecting the gate control electrode 240 of the first device to the output $B_1$ of the second circuit. Similarly, fourth means, including resistor 242 and diode 218, is provided for operatively connecting the anode electrode 236 of the second device to the control electrode E of the second transistor 200, fifth means, which may be a conductor wire, is provided for operatively connecting the cathode electrode 238 of the second device to ground, and sixth means, including diode 186, for operatively connecting the gate control electrode 240 of the second device to the output of the first circuit, is provided.

The above said first connecting means includes a first resistor 242, a first diode 218 and a first capacitor 246 and the above said fourth connecting means includes a second resistor 242, a second diode 218 and a second capacitor 246. Further, a third capacitor 220 is connected between the positive voltage termination of the first sensing means 46 and ground and a fourth capacitor 222 is connected between the negative voltage termination of the first sensing means 46 and ground, while a fifth capacitor 220 is connected between the positive voltage termination of the second sensing means 48 and ground and a sixth capacitor is connected between the negative voltage termination of the second sensing means 48 and ground.

I claim as my invention:

1. A system comprising output means, first means for driving said output means in one direction, second means for driving said output means in the opposite direction, first sensing means, second sensing means, first circuit means for operatively connecting said first sensing means to said first drive means, said first circuit means including first switch means for energizing said first drive means and first amplifier means for operating said first switch means to energize said first drive means when said first sensing means provides a predetermined output, second circuit means for operatively connecting said second sensing means to said second drive means, said second circuit means including second switch means for energizing said second drive means and second amplifier means for operating said second switch means to energize said second drive means when said second sensing means provides a predetermined output, first means for disabling said first circuit means when said second drive means is energized, and second means for disabling said second circuit means when said first drive means is energized, whereby, when one of said drive means is energized, the other of said drive means cannot be energized, said first disabling means being operatively connected to said first circuit means and said second disabling means being operatively connected to said second circuit means, said first amplifier means comprising a first circuit including an output connected to said first switch means and a first transistor having a control electrode operatively connected to said first sensing means, said first circuit being arranged to provide a signal at its said output effective to operate said first switch means when such a predetermined output of said first sensing means is applied to said control electrode of said first transistor, said second amplifier means comprising a second circuit including an output connected to said second switch means and a second transistor having a control electrode operatively connected to said second sensing means, said second circuit being arranged to provide a signal at its said output effective to operate said second switch means when such a predetermined output of said second sensing means is applied to said control electrode of said second transistor, said first disabling means including a first semiconductor device having an anode electrode, a cathode electrode, and a gate control electrode arranged, when pulsed, to render said first device conductive between its said anode and cathode electrodes, first means for operatively connecting the anode electrode of said first device to the control electrode of said first transistor, second means for operatively connecting the cathode electrode of said first device to ground, and third means for operatively connecting the gate control electrode of said first device to the output of said second circuit, whereby, when said second switch means is operated by said second circuit, a pulse is simultaneously applied to the gate control electrode of said first device to ground said control electrode of said first transistor through said first connecting means and the anode and cathode electrodes of said first device, and said second disabling means including a second semiconductor device having an anode electrode, a cathode electrode, and a gate control electrode arranged, when pulsed, to render said second device conductive between its said anode and cathode electrodes, fourth means for operatively connecting the anode electrode of said second device to the control electrode of said second transistor, fifth means for operatively connecting the cathode electrode of said second device to ground, and sixth means for operatively connecting the gate control electrode of said second device to the output of said first circuit, whereby, when said first switch means is operated by said first circuit, a pulse is simultaneously applied to the gate control electrode of said second device to ground said control electrode of said second transistor through said fourth connecting means and the anode and cathode electrodes of said second device.

2. The invention of claim 1 in which said first and second switch means are, respectively, silicon controlled rectifiers, in which said first and second transistors are, respectively, unijunction transistors having emitter electrodes serving, respectively, as their said control electrodes, and in which said first and second sensing means are, respectively, photovoltaic cells.

3. The invention of claim 2 in which said first connecting means includes a first resistor connected to the anode electrode of said first device, a first diode having its cathode electrode connected to the control electrode of said first transistor and its anode electrode connected through said first resistor to the anode electrode of said first device, and a first capacitor connected between the junction of said first resistor with the anode electrode of said first device and ground, and in which said fourth connecting means includes a second resistor connected to the anode electrode of said second device, a second diode having its cathode electrode connected to the control electrode of said second transistor and its anode electrode connected through said second resistor to the anode electrode of said second device, and a second capacitor connected between the junction of said second resistor with the anode electrode of said second device and ground.

4. The invention of claim 3 in which the photovoltaic cell of each of said sensing means is provided with a positive voltage termination and a negative voltage termination, the positive voltage termination of said first sensing means being connected to the junction of the control electrode of said first transistor with the cathode of said first diode and the negative voltage termination of said first sensing means being connected to the anode of said first diode, and the positive voltage termination of said second sensing means being connected to the junction of the control electrode of said second transistor and the cathode of said second diode and the negative voltage termination of said second sensing means being connected to the anode of said second diode.

5. The invention of claim 4 including a third capacitor connected between the positive voltage termination of said first sensing means and ground, a fourth capacitor connected between the negative voltage termination of said first sensing means and ground, a fifth capacitor connected between the positive voltage termination of said second sensing means and ground, and a sixth capacitor connected between the negative voltage termination of said second sensing means and ground.

6. The invention of claim 5 including a third resistor for connecting the gate control electrode of said first device to ground and a fourth resistor for connecting the gate control electrode of said second device to ground.

7. The invention of claim 6 in which said first and second drive means are, respectively, solenoid-type, rotary stepping motors.

8. The invention of claim 1 including a first delay circuit connected between the output of said first circuit and said first switch means and a second delay circuit connected between the output of said second circuit and said second switch means, said first delay circuit being effective to prevent operation of said first switch means before grounding of the control electrode of said second transistor and said second delay circuit being effective to prevent operation of said second switch means before grounding of the control electrode of said first transistor.

9. The invention of claim 2 including a first delay circuit connected between the output of said first circuit and said first switch means and a second delay circuit connected between the output of said second circuit and said second switch means, said first relay circuit being effective to prevent operation of said first switch means before grounding of the control electrode of said second transistor and said second delay circuit being effective to prevent operation of said second switch means before grounding of the control electrode of said first transistor, said first delay circuit including an inductor connected in series between the output of said first circuit and the gate control electrode of said first switch means and a delay capacitor connected between the junction of said electrode with said inductor and ground, and said second delay circuit including an inductor connected in series between the output of said second circuit and the gate control electrode of said second switch means and a delay capacitor connected between the junction of the last said electrode with the last said inductor and ground.

References Cited

UNITED STATES PATENTS 3,439,246    4/1969    Moritz _____ 318—297

BENJAMIN DOBECK, Primary Examiner

K. L. CROSSON, Assistant Examiner

U.S. Cl. X.R.

318—55, 290, 297

PO-1050
(5/69)

UNITED STATES PATENT OFFICE
CERTIFICATE OF CORRECTION

Patent No. 3,553,546            Dated January 5, 1971

Inventor(s)    Earl W. Springer

It is certified that error appears in the above-identified patent and that said Letters Patent are hereby corrected as shown below:

Column 5, line 15, change "by" to -- with --; same column, line 70, cancel "to".
Column 7, line 39, after "junction" insert -- transistor --.
Column 8, line 24, "indicator 4" should be -- indicator 14 --.
Column 12, line 11, (Claim 9, line 5) change "relay" to -- delay --.

Signed and sealed this 4th day of May 1971.

(SEAL)
Attest:

EDWARD M. FLETCHER, JR.          WILLIAM E. SCHUYLER,
Attesting Officer               Commissioner of Paten